US008990825B1

(12) United States Patent
Martin et al.

(10) Patent No.: US 8,990,825 B1
(45) Date of Patent: Mar. 24, 2015

(54) ALLOCATION OF RESOURCES TO PARTICULAR PORTIONS OF PROCESSES BASED ON NEGOTIATION BETWEEN PROCESSES

(75) Inventors: Jocelyn Luke Martin, Burwell (GB); Christopher T. Newbold, Lexington, MA (US)

(73) Assignee: The MathWorks, Inc., Natick, MA (US)

( * ) Notice: Subject to any disclaimer, the term of this patent is extended or adjusted under 35 U.S.C. 154(b) by 679 days.

(21) Appl. No.: 13/250,502

(22) Filed: Sep. 30, 2011

(51) Int. Cl.
*G06F 9/46* (2006.01)

(52) U.S. Cl.
USPC .......................................................... 718/104

(58) Field of Classification Search
CPC ......... G06F 9/52; G06F 9/505; G06F 9/5016; G06F 9/5083
See application file for complete search history.

(56) References Cited

U.S. PATENT DOCUMENTS

| 6,948,172 | B1 * | 9/2005 | D'Souza ........................ 718/106 |
| 2005/0005272 | A1 * | 1/2005 | Moody et al. ................. 718/104 |
| 2007/0011683 | A1 * | 1/2007 | Helander ....................... 718/104 |
| 2007/0204268 | A1 * | 8/2007 | Drepper ........................ 718/102 |

* cited by examiner

*Primary Examiner* — Meng An
*Assistant Examiner* — James J Lee
(74) *Attorney, Agent, or Firm* — Harrity & Harrity, LLP

(57) ABSTRACT

A device determines a number of portions of processes that require resources associated with the device, and receives resource usage information from the resources. The device also enables negotiations among the processes to determine a number of resources for respective ones of the processes based on the resource usage information, and allocates particular resources to particular portions of the respective ones of the processes based on the negotiations between the processes.

25 Claims, 8 Drawing Sheets

ALLOCATION OF RESOURCES TO PARTICULAR PORTIONS OF PROCESSES BASED ON NEGOTIATION BETWEEN PROCESSES

BACKGROUND

A variety of devices, such as personal computers, or groups of such devices, may attempt to execute processes that include multiple portions (e.g., threads). Many processes currently compete for hardware and/or software resources associated with a device, and the processes are unaware of how many resources to make available for execution of the processes by the device. At any one time, the processes may include more executable portions than the available device resources can handle. However, since the device may view all processes equally, some processes or process portions may need to wait an inordinate amount of time for the device resources to become available and execute the waiting processes or process portions. This may be problematic especially if such processes or process portions are more important than other processes or process portions currently being handled by the device resources.

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may allow multiple processes on a single device to negotiate device resource usage in a dynamic fashion so that each process may receive a fair share of device resources. The systems and/or methods may prevent over-subscription of the device in the case where several of the processes are concurrently being executed. The systems and/or methods may enable the processes to join together in a federated way so that the processes may negotiate a fair amount of device resources for each process. The number of processes joined in the federated group may increase or decrease over time. In one example, the processes may constantly negotiate the amount of device resources for each process or may negotiate the amount of device resources after a particular time period. The systems and/or methods may locally control device resource usage by the processes based on the negotiations among the federated processes. Such an arrangement may ensure that device resources are optimally utilized by the multiple processes.

In one example implementation, a device may receive or generate processes to be executed, and may determine a number of portions (e.g., sections of a complete process), to be executed, in each process. The device may receive resource usage information from resources (e.g., hardware and/or software resources) associated with the device, and may receive a control strategy for controlling the execution of the processes. The device may join the processes together to enable the processes to negotiate use of a number of resources for each process based on the resource usage information and/or the control strategy. The device may allocate particular resources to particular portions of each process based on the negotiations, and may provide the particular portions to the particular resources for execution. The device may continuously or periodically repeat the aforementioned allocation strategy until a predetermined condition occurs (e.g., a timeout or error occurs, no more processes are pending execution, etc.).

The terms a "portion" or a "process portion," as used herein, are to be broadly interpreted to include any division or sub-process of a process, such as contiguous sections of program code and/or non-contiguous sections of program code. For example, a portion or process portion may include a thread or threads of program code.

The terms "resource" or "device resource," as used herein, are to be broadly interpreted to include a hardware resource or a software resource of a device or a group of devices. For example, a hardware resource may include a memory device, a central processing unit (CPU), a graphical processing unit (GPU), a core of a CPU or GPU, etc. A software resource may include a socket, a thread, a semaphore, an inter-process communications (IPC) mechanism, etc.

Example Device Interactions

Figure 1:
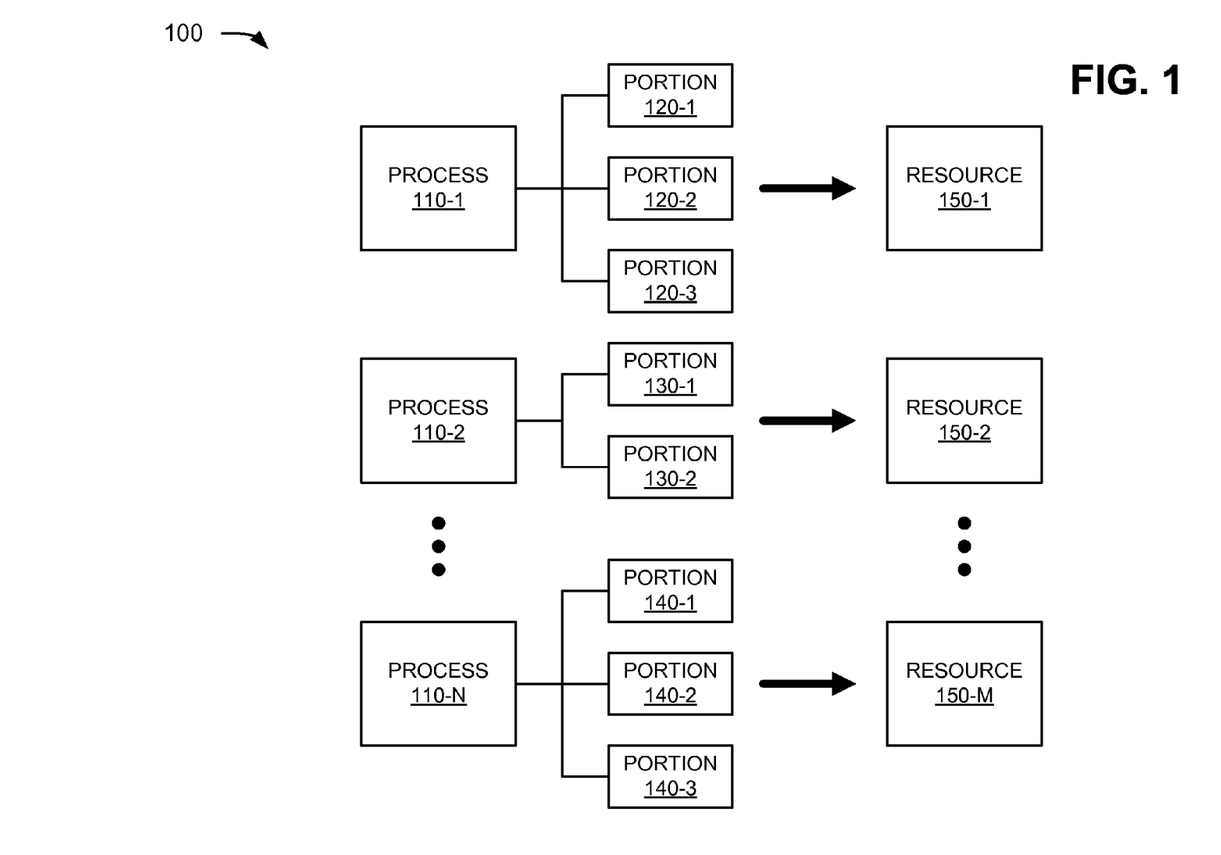
FIG. 1 is a diagram of example interactions between processes and resources of a device(s) according to implementations described herein.

FIG. 1 is a diagram of example interactions 100 between processes and resources of a device, or a group of interconnected devices, according to implementations described herein. In one example implementation, the device may include a device that is capable of executing one or more processes via one or more resources of the device. For example, the device may include a laptop computer, a personal computer, a tablet computer, a desktop computer, and/or other computation and/or communication devices.

As illustrated in FIG. 1, the device may include multiple processes 110-1 through 110-N (collectively referred to herein as "processes 110," and, in some instances, singularly as "process 110") to be executed or handled. Each of processes 110 may include one or more portions to be executed or handled. For example, process 110-1 may include portions 120-1, 120-2, and 120-3 (collectively referred to herein as "portions 120"). Process 110-2 may include portions 130-1 and 130-2 (collectively referred to herein as "portions 130"). Process 110-N may include portions 140-1, 140-2, and 140-3 (collectively referred to herein as "portions 140"). Portions 120-140 may be executed or handled by one or more of multiple resources 150-1 through 150-M (collectively referred to herein as "resources 150," and, in some instances, singularly as "resource 150").

Three processes 110, three portions 120, two portions 130, three portions 140, and three resources 150 have been illustrated in FIG. 1 for simplicity. In practice, there may be more processes 110, portions 120, portions 130, portions 140, and/or resources 150. In one example implementation, one or more of processes 110, portions 120, portions 130, portions 140, and/or resources 150 may be provided within one or more devices.

Process 110 may include program code to be executed or handled by resources of the device. In one example, process 110 may include processes generated by a technical computing environment (TCE). A TCE may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, the TCE may include a dynamically-typed programming language (e.g., the M language or MATLAB® language) that can be used to express problems and/or solutions in mathematical notations. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). Alternatively, or additionally, the TCE may provide these functions as block sets, or in another way, such as via a library, etc.

The TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabViewt by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhpsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Each of portions 120 may include any division or sub-process of process 110-1, such as contiguous portions of process 110-1 and/or non-contiguous portions of process 110-1. Each of portions 130 may include any division or sub-process of process 110-2, such as contiguous portions of process 110-2 and/or non-contiguous portions of process 110-2. Each of portions 140 may include any division or sub-process of process 110-N, such as contiguous portions of process 110-N and/or non-contiguous portions of process 110-N. In one example, each of portions 120-140 may include a thread or threads of program code.

Resource 150 may include a hardware resource or a software resource of a device or a group of devices. For example, a hardware resource may include a memory device, a CPU, a GPU, a core of a CPU or GPU, etc. of a device. A software resource may include a socket, a thread, a semaphore, an IPC mechanism, etc.

If a number of resources 150 is greater than or equal to a number of portions 120-140, the device may efficiently handle execution of portions 120-140 with resources 150 without undesirable delays. However, if the number of resources 150 is less than the number of portions 120-140, some of portions 120-140 may need to wait an inordinate amount of time for resources 150 to become available and execute some of portions 120-140. This may be problematic especially if portions 120-140 waiting to be executed are more important than other portions 120-140 currently being handled by resources 150.

In one example implementation, the device may determine a number of portions 120-140, to be executed, in each process 110, may receive resource usage information (e.g., availability information, capacity information, etc.) from resources 150, and may receive a control strategy for controlling the execution of processes 110. The device may join processes 110 together to enable processes 110 to negotiate use of a number of resources 150 for each process 110 based on the resource usage information and/or the control strategy. The device may allocate particular resources 150 to particular portions 120-140 of each process 110 based on the negotiations, and may provide the particular portions 120-140 to the particular resources 150 for execution. The device may continuously or periodically repeat the aforementioned allocation strategy until a predetermined condition occurs (e.g., a timeout or error occurs, no more processes are pending execution, etc.).

Although FIG. 1 shows example components of the device, in other implementations, the device may include fewer components, different components, differently arranged components, and/or additional components than those depicted in FIG. 1. Alternatively, or additionally, one or more components of the device may perform one or more other tasks described as being performed by one or more other components of the device.

Example Device Architecture

Figure 2:
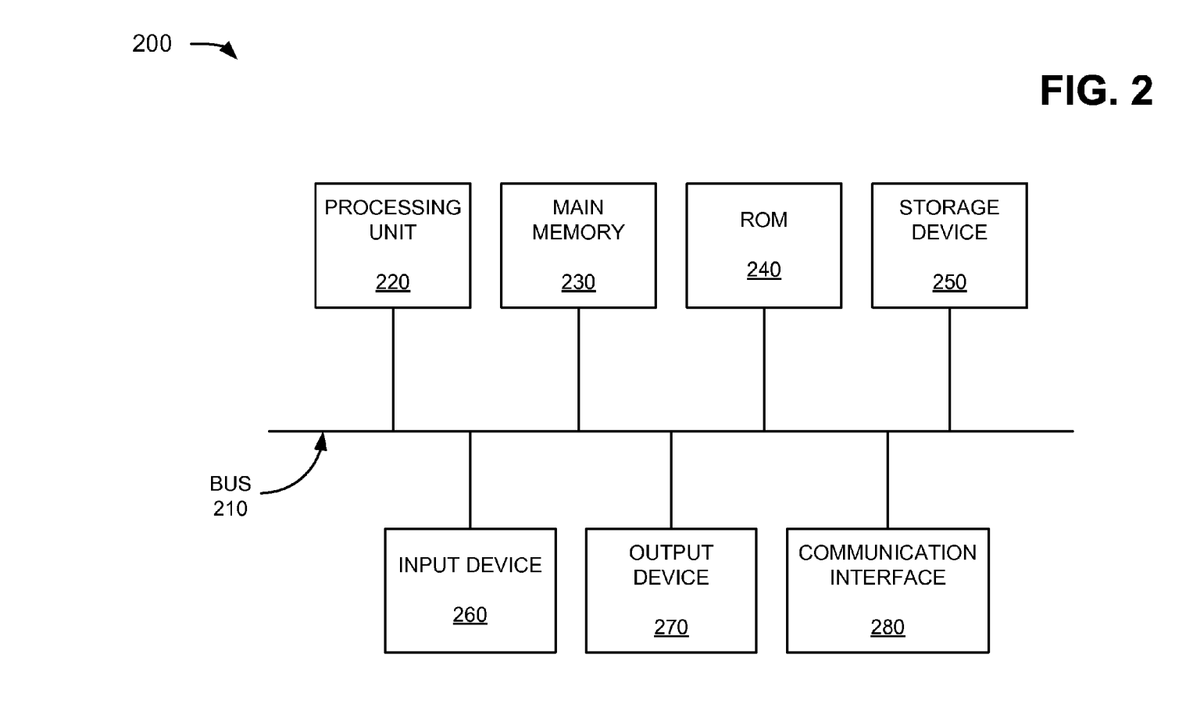
FIG. 2 is a diagram of example components of a device according to implementations described herein.

FIG. 2 is an example diagram of a device 200 that may correspond to the device described above in connection with FIG. 1. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits a user to input information to device 200, such as a keyboard, a mouse, a pen, a microphone, voice recognition and/or biometric mechanisms, a remote control, a touch screen, etc. Output device 270 may include a mechanism that outputs information to the user, including a display, a printer, a speaker, etc. Communication interface 280 may include any transceiver-like mechanism that enables device 200 to communicate with other devices, networks, and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, and/or additional components than depicted in FIG. 2. Alternatively, or additionally, one or more components of device 200 may perform one or more other tasks described as being performed by one or more other components of device 200.

Example Multi-Process Resource Allocation

Figure 3:
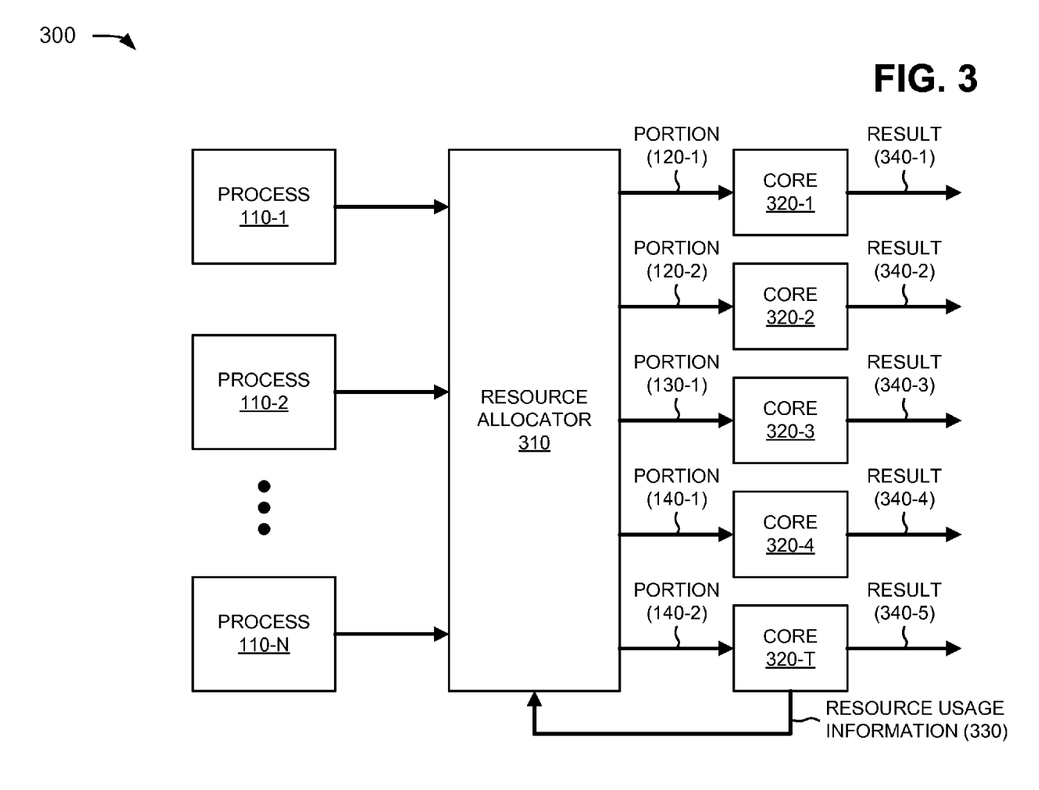
FIG. 3 is a diagram of example interactions between processes and resources of an example portion of the device depicted in FIG. 2.

FIG. 3 is a diagram of example interactions between components of an example portion 300 of device 200 (FIG. 2). As illustrated, example device portion 300 may include processes 110, portions 120-1, 120-2, 130-1, 140-1, and 140-2, a resource allocator 310, and multiple cores 320-1 through 320-T (collectively referred to herein as "cores 320," and, in some instances, singularly as "core 320"). Processes 110 and portions 120-1, 120-2, 130-1, 140-1, and 140-2 may include the features described above in connection with FIG. 1.

Resource allocator 310 may receive processes 110 provided to or generated by device 200, and may determine a number of portions, to be executed, in each process 110. For example, with reference to FIG. 1, resource allocator 310 may determine that process 110-1 includes portions 120-1, 120-2, and 120-3, may determine that process 110-2 includes portions 130-1 and 130-2, and may determine that process 110-N includes portions 140-1, 140-2, and 140-3. As further shown in FIG. 3, resource allocator 310 may receive resource usage information 330 from processes 110 and/or from one or more of cores 320. Resource usage information 330 may include information regarding a number of resources (e.g., cores 320) actually in use, information regarding an amount of resource bandwidth (e.g., a percentage of a resource capacity) to be used by processes 110, information about the capacity of the resources (e.g., cores 320), information regarding resources (e.g., cores 320) required to execute processes 110, etc.

Resource allocator 310 may dynamically join processes 110 together in a federation to enable the federation of processes 110 to negotiate use of a number of resources (e.g., cores 320) for each process 110 based on resource usage information 330. In one example, the number of processes 110 in the federation may increase or decrease over time, and the federation of processes 110 may be continuously recreated or may be recreated after a particular time period. Resource allocator 310 may allocate particular resources (e.g., cores 320) to particular ones of portions 120-140 based on the negotiations by the federation of processes 110. Based on the negotiations, for example, resource allocator 310 may determine that cores 320-1 and 320-2 should be allocated to portions 120-1 and 120-2 of process 110-1 and that portion 120-3 of process 110-1 should not be allocated a resource at this time. Resource allocator 310 may determine that core 320-3 should be allocated to portion 130-1 of process 110-2 and that portion 130-2 of process 110-2 should not be allocated a resource at this time. Resource allocator 310 may determine that cores 320-4 and 320-T should be allocated to portions 140-1 and 140-2 of process 110-N and that portion 140-3 of process 110-N should not be allocated a resource at this time.

As further shown in FIG. 3, resource allocator 310 may provide portion 120-1 to core 320-1, may provide portion 120-2 to core 320-2, may provide portion 130-1 to core 320-3, may provide portion 140-1 to core 320-4, and may provide portion 140-2 to core 320-T. Further details of resource allocator 310 are provided below in connection with, for example, FIGS. 4 and 5.

Cores 320 may be integrated onto a single integrated circuit die (e.g., a chip multiprocessor (CMP)) or may be integrated onto multiple dies in a single chip package. Each of cores 320 may include a processor, a microprocessor, or another type of processing unit that may interpret and execute instructions. In one example implementation, one or more of cores 320 may be replaced with other hardware and/or software resources.

As shown in FIG. 3, core 320-1 may receive portion 120-1, and may execute portion 120-1 to produce a result 340-1 (e.g., an output). Core 320-2 may receive portion 120-2, and may execute portion 120-2 to produce a result 340-2. Core 320-3 may receive portion 130-1, and may execute portion 130-1 to produce a result 340-3. Core 320-4 may receive portion 140-1, and may execute portion 140-1 to produce a result 340-4. Core 320-T may receive portion 140-2, and may execute portion 140-2 to produce a result 340-5.

Although FIG. 3 shows example components of device portion 300, in other implementations, device portion 300 may include fewer components, different components, differently arranged components, and/or additional components than depicted in FIG. 3. Alternatively, or additionally, one or more components of device portion 300 may perform one or more other tasks described as being performed by one or more other components of device portion 300.

Example Resource Allocator

Figure 4:
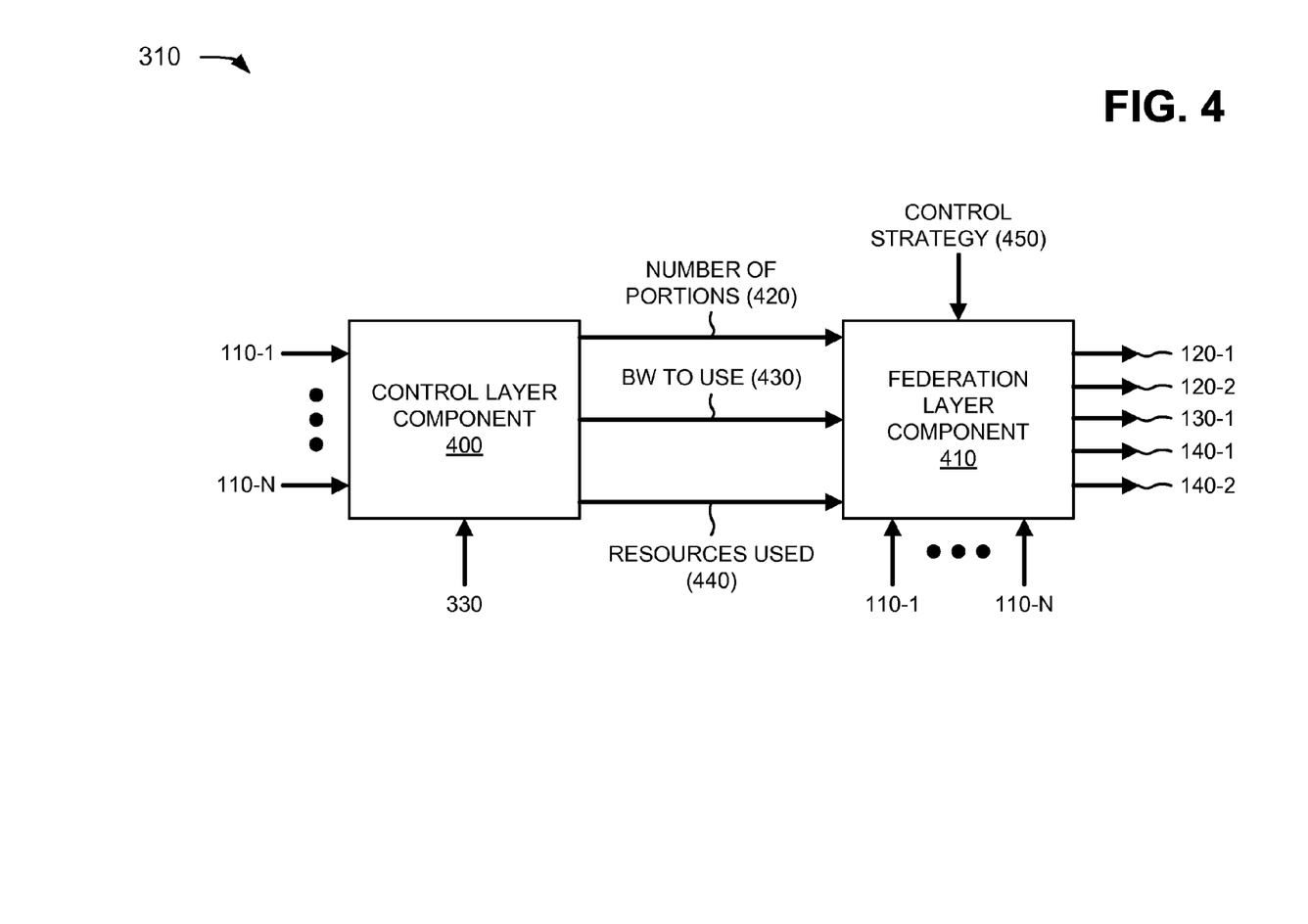
FIG. 4 is a diagram of example functional components of a resource allocator illustrated in FIG. 3.

FIG. 4 is a diagram of example functional components of resource allocator 310 (FIG. 3). In one example implementation, the functions described in connection with FIG. 4 may be performed by one or more components of device 200 (FIG. 2). As shown in FIG. 4, resource allocator 310 may include a control layer component 400 and a federation layer component 410.

Control layer component 400 may receive processes 110 provided to or generated by device 200, and may receive resource usage information 330 from processes 110 and/or from one or more of resources (e.g., cores 320, FIG. 3). Control layer component 400 may determine information from processes 110 and/or resource usage information 330. For example, control layer component 400 may determine a number 420 of portions in each process 110 by automatically analyzing each process 110 to determine a number of portions associated with each process 110, by identifying pre-programmed indications of divisible portions of processes 110, etc. Control layer component 400 may also determine information 430 regarding an amount of bandwidth to be used by processes 110, information 440 regarding a number of resources (e.g., cores 320) actually in use, information about the capacity of the resources (e.g., cores 320), information regarding resources (e.g., cores 320) required to execute processes 110, etc. Control layer component 400 may provide number 420 of portions in each process 110, information 430, and information 440 to federation layer component 410.

Federation layer component 410 may receive number 420 of portions in each process 110, information 430, and information 440 from control layer component 400, and may receive processes 110. As further shown in FIG. 4, federation layer component 410 may receive a control strategy 450 from a user of device 200 or device 200 may generate and provide control strategy 450 to resource allocator 310. Control strategy 450 may include policy information, such as priorities assigned to processes 110, expected number of portions of processes 110, etc.; whether resources are to be saturated or completely utilized by processes 110; timing information associated with formation of the federation of processes 110; etc.

Federation layer component 410 may dynamically join processes 110 together in a federation to enable the federation of processes 110 to negotiate use of a number of resources for each process 110 based on resource usage information 330, number 420 of portions in each process 110, information 430, information 440, and/or control strategy 450. Federation layer component 410 may allocate particular resources to particular ones of portions of processes 110 based on the negotiations by the federation of processes 110. Based on the negotiations, for example, federation layer component 410 may determine that cores 320-1 and 320-2 should be allocated to portions 120-1 and 120-2 of process 110-1 and that portion 120-3 of process 110-1 should not be allocated a resource at this time. Federation layer component 410 may determine that core 320-3 should be allocated to portion 130-1 of process 110-2 and that portion 130-2 of process 110-2 should not be allocated a resource at this time. Federation layer component 410 may determine that cores 320-4 and 320-T should be allocated to portions 140-1 and 140-2 of process 110-N and that portion 140-3 of process 110-N should not be allocated a resource at this time. As further shown in FIG. 4, federation layer component 410 may provide portions 120-1, 120-2, 130-1, 140-1, and 140-2 to the determined resources.

Although FIG. 4 shows example functional components of resource allocator 310, in other implementations, resource allocator 310 may include fewer functional components, different functional components, differently arranged functional components, and/or additional functional components than depicted in FIG. 4. Alternatively, or additionally, one or more functional components of resource allocator 310 may perform one or more other tasks described as being performed by one or more other functional components of resource allocator 310.

Example Federation Layer Component

Figure 5:
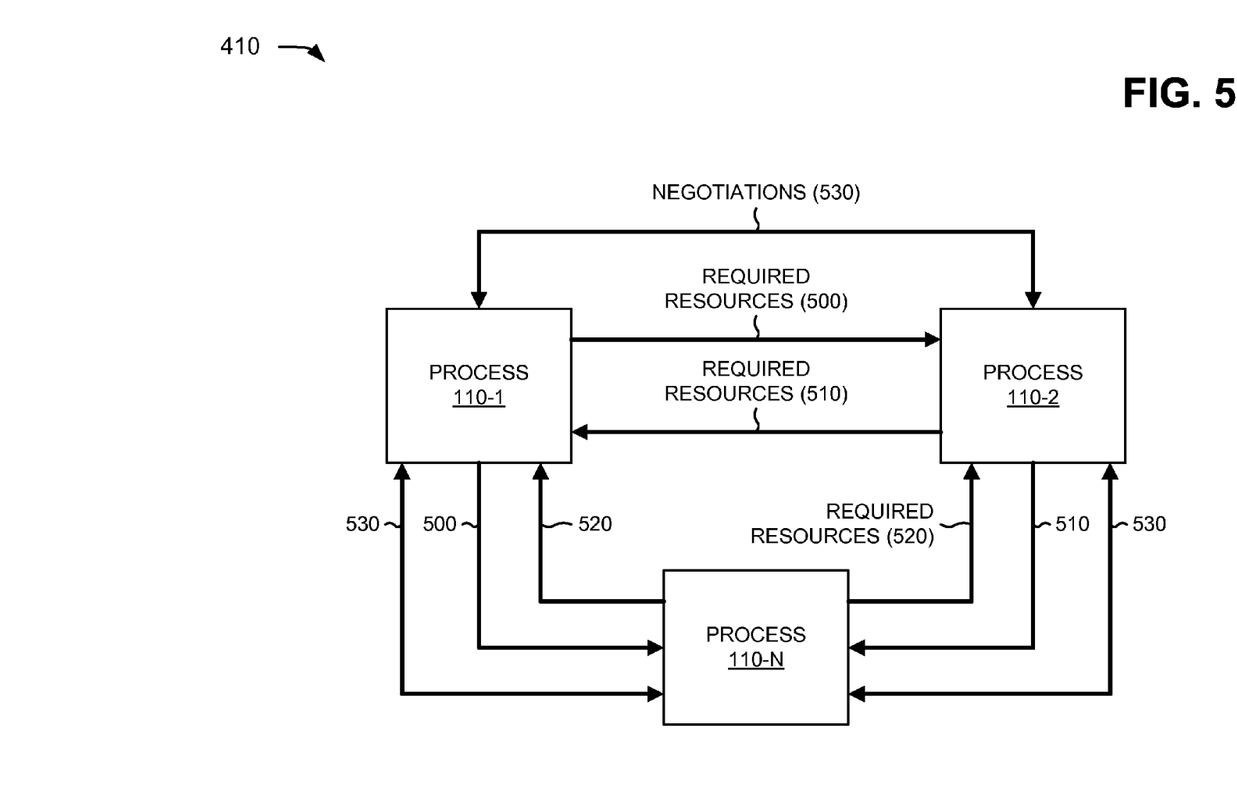
FIG. 5 is a diagram of example functional components of a federation layer component depicted in FIG. 4.

FIG. 5 is a diagram of example functional components of federation layer component 410 (FIG. 4). In one implementation, the functions described in connection with FIG. 5 may be performed by one or more components of device 200 (FIG. 2). As shown in FIG. 5, federation layer component 410 may include processes 110-1, 110-2, and 110-N. Processes 110-1, 110-2, and 110-N may include the features described above in connection with, for example, one or more of FIGS. 1-4.

Federation layer component 410 may dynamically join processes 110-1, 110-2, and 110-N together in a federation to enable the federation of processes 110-1, 110-2, and 110-N to negotiate use of a number of resources for each of processes 110-1, 110-2, and 110-N. In one example implementation, the number of processes 110-1, 110-2, and 110-N in the federation may increase or decrease over time, and the federation of processes 110-1, 110-2, and 110-N may be continuously recreated or may be recreated after a particular time period. For example, process 110-N may leave the federation after process 110-N is executed by a resource, and processes 110-3 and 110-4 (not shown) may join the federation. In one implementation, one of processes 110-1, 110-2, and 110-N may define rules for managing the federation, such as only increase the size of the federation, never decrease the size of the federation, etc.

As further shown in FIG. 5, process 110-1 may provide, to processes 110-2 and 110-N, information 500 regarding resources required by process 110-1. Process 110-2 may provide, to processes 110-1 and 110-N, information 510 regarding resources required by process 110-2. Process 110-N may provide, to processes 110-1 and 110-2, information 520 regarding resources required by process 110-N. Based on information 500-520, resource usage information 330, number 420 of portions in each process 110, information 430, information 440, and/or control strategy 450, one or more of processes 110-1, 110-2, and 110-N may determine a best effort resource allocation for processes 110-1, 110-2, and 110-N. Processes 110-1, 110-2, and 110-N may negotiate the allocation of resources for processes 110-1, 110-2, and 110-N, as indicated by reference number 530. For example, negotiations 530 may prioritize one or more of processes 110-1, 110-2, and 110-N based on specific resource requests of processes 110-1, 110-2, and 110-N, whether one of processes 110-1, 110-2, and 110-N requires a maximum or a minimum amount of resources, etc.

Processes 110-1, 110-2, and 110-N may be specially coded to implement pre-agreed upon interfaces to support querying of information 500-520 from each other regarding the required resources, as well as to support negotiations 530 among processes 110-1, 110-2, and 110-N. For example, processes 110-1, 110-2, and 110-N may be specially coded so that processes 110-1, 110-2, and 110-N may communicate with each other, exchange information 500-520, and conduct negotiations 530.

In one example implementation, the federation may allocate particular resources to particular ones of processes 110-1, 110-2, and 110-N based on negotiations 530 by the federation. Alternatively, or additionally, negotiations 530 may include processes 110-1, 110-2, and 110-N of the federation negotiating resource usage so that each of processes 110-1, 110-2, and 110-N may utilize at least a portion of the available resources.

Although FIG. 5 shows example functional components of federation layer component 410, in other implementations, federation layer component 410 may include fewer functional components, different functional components, differently arranged functional components, and/or additional functional components than depicted in FIG. 5. Alternatively, or additionally, one or more functional components of federation layer component 410 may perform one or more other tasks described as being performed by one or more other functional components of federation layer component 410.

Example Process

Figure 6:
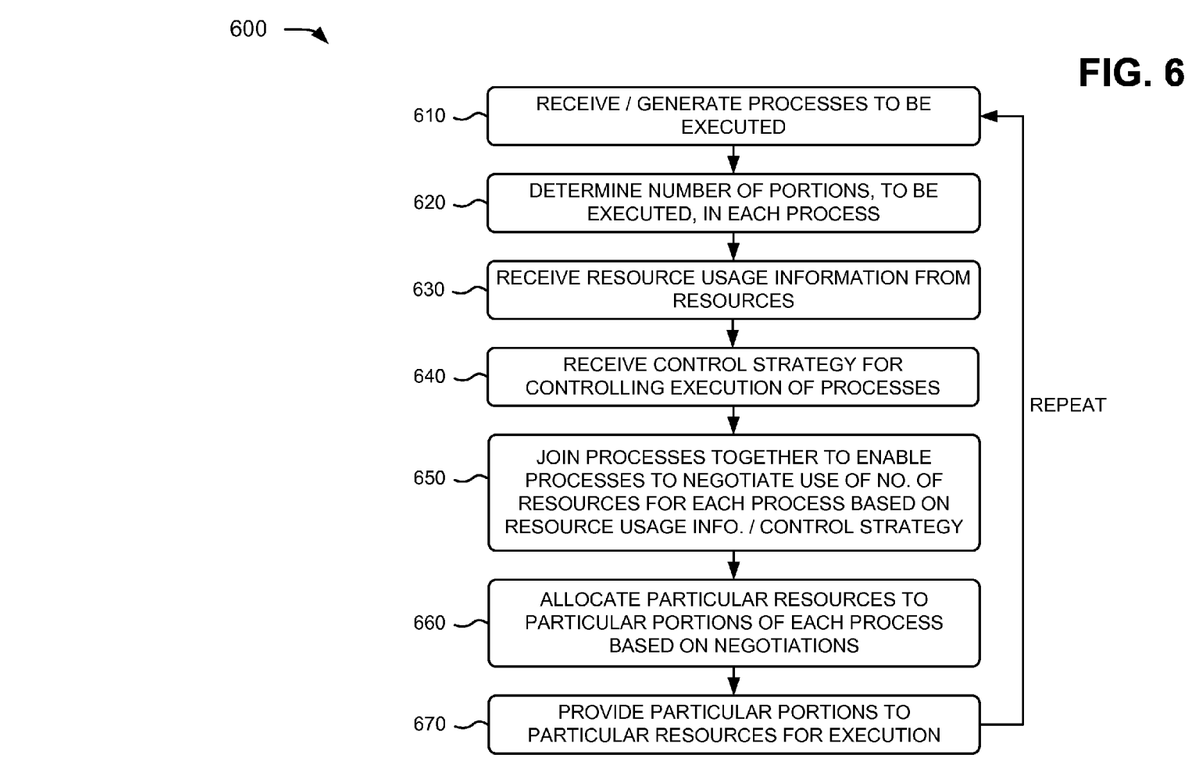
FIGS. 6-8 are flow charts of an example process for allocating process portions to device resources according to implementations described herein.
Figure 7:
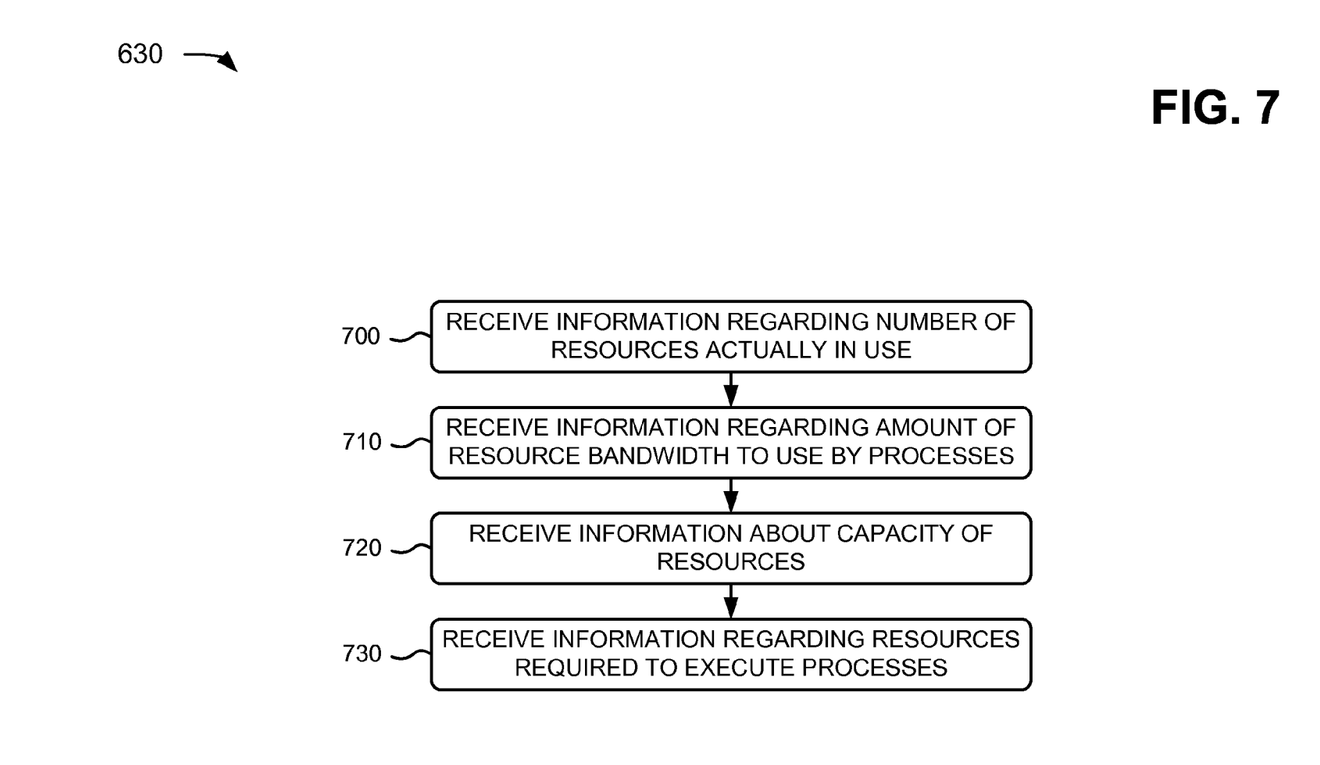
Figure 8:
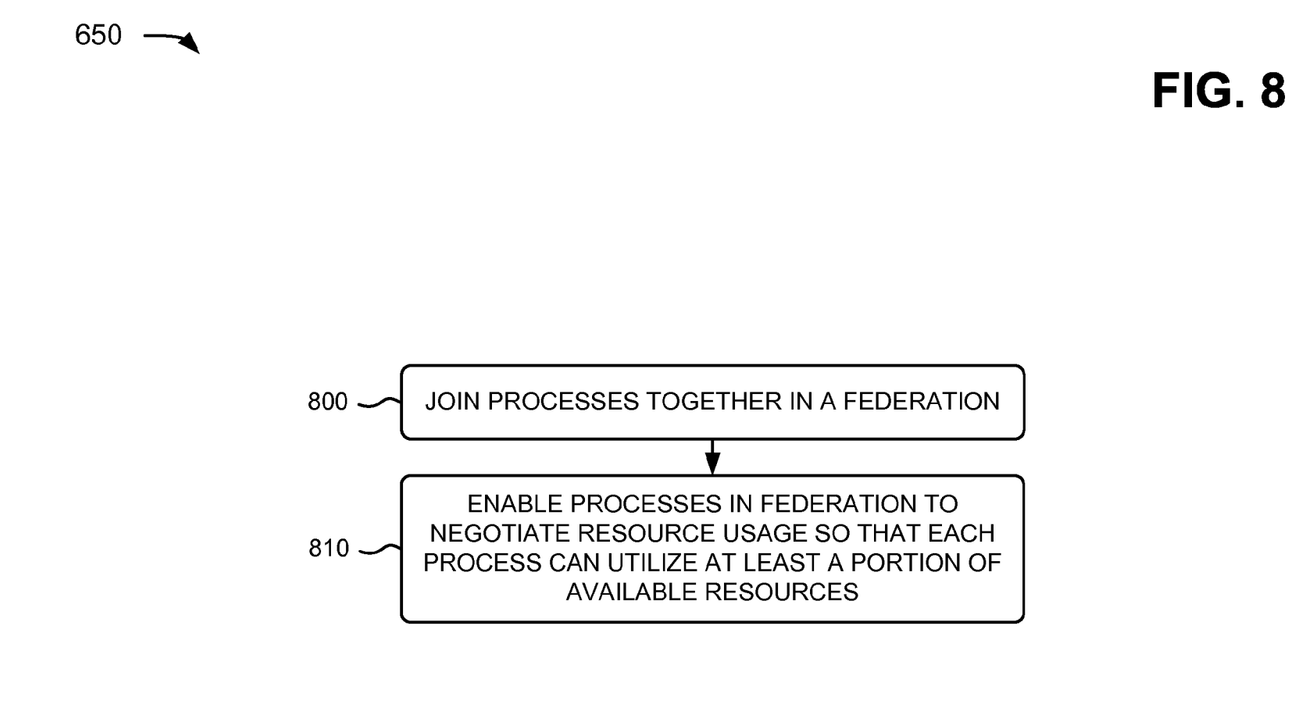

FIGS. 6-8 are flow charts of an example process 600 for allocating process portions to device resources according to implementations described herein. In one implementation, process 600 may be performed by device 200. Alternatively, or additionally, process 600 may be performed by another device or a group of devices separate from or including device 200.

As shown in FIG. 6, process 600 may include receiving or generating processes to be executed (block 610), and determining a number of portions, to be executed, in each process (block 620). For example, in an implementation described above in connection with FIG. 3, resource allocator 310 may receive processes 110 provided to or generated by device 200, and may determine a number of portions, to be executed, in each process 110. In one example, resource allocator 310 may determine that process 110-1 includes portions 120-1, 120-2, and 120-3, may determine that process 110-2 includes portions 130-1 and 130-2, and may determine that process 110-N includes portions 140-1, 140-2, and 140-3.

As further shown in FIG. 6, process 600 may include receiving resource usage information from resources (block 630), and receiving a control strategy for controlling execution of the processes (block 640). For example, in an implementation described above in connection with FIG. 4, control layer component 400 of resource allocator 310 may receive resource usage information 330 from processes 110 and/or from one or more of resources (e.g., cores 320). Control layer component 400 may determine number 420 of portions in each process 110, information 430 regarding an amount of bandwidth to be used by processes 110, information 440 regarding a number of resources (e.g., cores 320) actually in use, information about the capacity of the resources (e.g., cores 320), information regarding resources (e.g., cores 320) required to execute processes 110, etc. Federation layer component 410 of resource allocator 310 may receive control strategy 450 from a user of device 200 or device 200 may generate and provide control strategy 450 to resource allocator 310. Control strategy 450 may include policy information, such as priorities assigned to processes 110, expected number of portions of processes 110, etc.; whether resources are to be saturated or completely utilized by processes 110; timing information associated with formation of the federation of processes 110; etc.

Returning to FIG. 6, process 600 may include joining the processes together to enable the processes to negotiate use of a number of resources for each process based on the resource usage information and/or the control strategy (block 650). For example, in an implementation described above in connection with FIGS. 4 and 5, federation layer component 410 may dynamically join processes 110 together in a federation to enable the federation of processes 110 to negotiate use of a number of resources for each process 110 based on resource usage information 330, number 420 of portions in each process 110, information 430, information 440, and/or control strategy 450. Based on information 500-520, resource usage information 330, number 420 of portions in each process 110, information 430, information 440, and/or control strategy 450, one or more of processes 110-1, 110-2, and 110-N of the federation may determine a best effort resource allocation for processes 110-1, 110-2, and 110-N. Processes 110-1, 110-2, and 110-N may negotiate the allocation of resources for processes 110-1, 110-2, and 110-N, as indicated by reference number 530. For example, negotiations 530 may prioritize one or more of processes 110-1, 110-2, and 110-N based on specific resource requests of processes 110-1, 110-2, and 110-N, whether one of processes 110-1, 110-2, and 110-N requires a maximum or a minimum amount of resources, etc.

As further shown in FIG. 6, process 600 may include allocating particular resources to particular portions of each process based on the negotiations (block 660), providing the particular portions to the particular resources for execution (block 670), and returning to process block 610. For example, in an implementation described above in connection with FIG. 4, federation layer component 410 may allocate particular resources to particular ones of portions of processes 110 based on the negotiations by the federation of processes 110. Based on the negotiations, for example, federation layer component 410 may determine that cores 320-1 and 320-2 should be allocated to portions 120-1 and 120-2 of process 110-1 and that portion 120-3 of process 110-1 should not be allocated a resource at this time. Federation layer component 410 may determine that core 320-3 should be allocated to portion 130-1 of process 110-2 and that portion 130-2 of process 110-2 should not be allocated a resource at this time. Federation layer component 410 may determine that cores 320-4 and 320-T should be allocated to portions 140-1 and 140-2 of process 110-N and that portion 140-3 of process 110-N should not be allocated a resource at this time. Federation layer component 410 may provide portions 120-1, 120-2, 130-1, 140-1, and 140-2 to the determined resources for execution. Device 200 may continuously or periodically repeat the aforementioned allocation strategy until a predetermined condition occurs (e.g., a timeout or error occurs, no more processes are pending execution, etc.).

Process block 630 may include the process blocks depicted in FIG. 7. As shown in FIG. 7, process block 630 may include receiving information regarding a number of resources actually in use (block 700), receiving information regarding an amount of resource bandwidth to use by the processes (block 710), receiving information about the capacity of the resources (block 720), and receiving information regarding resources required to execute the processes (block 730). For example, in an implementation described above in connection with FIG. 3, resource allocator 310 may receive resource usage information 330 from processes 110 and/or from one or more of cores 320. Resource usage information 330 may include information regarding a number of resources (e.g., cores 320) actually in use, information regarding an amount of bandwidth to be used by processes 110, information about the capacity of the resources (e.g., cores 320), information regarding resources (e.g., cores 320) required to execute processes 110, etc.

Process block 650 may include the process blocks depicted in FIG. 8. As shown in FIG. 8, process block 650 may include joining the processes together in a federation (block 800), and enabling the processes in the federation to negotiate resource usage so that each process can utilize at least a portion of the available resources (block 810). For example, in an implementation described above in connection with FIG. 5, federation layer component 410 may dynamically join processes 110-1, 110-2, and 110-N together in a federation to enable the federation of processes 110-1, 110-2, and 110-N to negotiate use of a number of resources for each of processes 110-1, 110-2, and 110-N. Processes 110-1, 110-2, and 110-N may negotiate the allocation of resources for processes 110-1, 110-2, and 110-N, as indicated by reference number 530. In one example, negotiations 530 may prioritize one or more of processes 110-1, 110-2, and 110-N based specific resource requests of processes 110-1, 110-2, and 110-N, whether one of processes 110-1, 110-2, and 110-N requires a maximum or a minimum amount of resources, etc. Alternatively, or additionally, negotiations 530 may include processes 110-1, 110-2, and 110-N of the federation negotiating resource usage so that each of processes 110-1, 110-2, and 110-N may utilize at least a portion of the available resources.

Conclusion

Systems and/or methods described herein may allow multiple processes on a single device to negotiate device resource usage in a dynamic fashion so that each process may receive a fair share of device resources. The systems and/or methods may prevent over-subscription of the device in the case where several of the processes are concurrently being executed. The systems and/or methods may enable the processes to join together in a federated way so that the processes may negotiate a fair amount of device resources for each process. The number of processes joined in the federated group may increase or decrease over time. In one example, the processes may constantly negotiate the amount of device resources for each process or may negotiate the amount of device resources after a particular time period. The systems and/or methods may locally control device resource usage by the processes based on the negotiations among the federated processes. Such an arrangement may ensure that device resources are optimally utilized by the multiple processes.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as a processor, a microprocessor, an application-specific integrated circuit (ASIC), a field-programmable gate array (FPGA), a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   identifying a plurality of processes to be executed by a device,
      each of the plurality of processes including one or more portions, and
      the identifying being performed by the device;
   determining a quantity of portions for each of the plurality of processes that require resources,
      the determining being performed by the device;
   receiving a resource usage information from the plurality of processes,
      the receiving being performed by the device;
   forming a federation of processes that includes the plurality of processes,
      the forming being performed by the device;
   negotiating among the plurality of processes,
      the negotiating being performed by the device, and
      the negotiating comprising:
         exchanging information regarding specific resources required by each process to other processes in the federation of processes; and
         determining an allocation of resources for respective ones of at least two of the plurality of processes based on the quantity of portions in each process, the resource usage information, and the exchanged information regarding the specific resources required by each process; and
   allocating particular resources, of the resources, to particular portions of the respective ones of the at least two of the plurality of processes based on the negotiations among the plurality of processes,
      the allocating being performed by the device.

2. The method of claim 1, further comprising:
   providing the particular portions to the particular resources for execution; and
   executing the particular portions with the particular resources.

3. The method of claim 1, further comprising:
   receiving a control strategy for controlling execution of the plurality of processes,
   where forming the federation of processes includes:
      joining the plurality of processes together to enable the plurality of processes to negotiate use of the resources, for the respective ones of the at least two of the plurality of processes, based on the resource usage information and on the control strategy.

4. The method of claim 1, where the resource usage information includes information derived from the resources.

5. The method of claim 1, further comprising:
   enabling the federation of the processes to negotiate the allocation of the resources,
      the allocation of the resources enabling the respective ones of the at least two of the plurality of processes to utilize, for execution, at least a portion of the resources.

6. The method of claim 1, where the method is repeated after a predetermined time period or when an external event occurs.

7. The method of claim 1, where the method is continuously repeated until a predetermined condition occurs.

8. The method of claim 1, where the resources comprise one or more of:
- a hardware resource, or
- a software resource.

9. One or more non-transitory computer-readable media storing instructions, the instructions comprising:
- one or more instructions that, when executed by a processor of a device, cause the processor to:
  - identify a plurality of processes to be executed by the device,
    - each of the plurality of processes including one or more portions;
  - determine a quantity of portions for each of the plurality of processes that require resources;
  - receive a resource usage information from the plurality of processes;
  - form a federation of processes that includes the plurality of processes;
  - negotiate among the plurality of processes,
    - the one or more instructions to negotiate including:
      - one or more instructions that, when executed by the processor, cause the processor to:
        - exchange information regarding specific resources required by each process to other processes in the federation of processes; and
        - determine an allocation of resources for respective ones of at least two of the plurality of processes based on the quantity of portions in each process, the resource usage information, and the exchanged information regarding the specific resources required by each process; and
  - allocate particular resources to particular portions of the respective ones of the at least two of the plurality of processes based on the negotiating among the plurality of processes.

10. The one or more non-transitory computer-readable media of claim 9, where the instructions further comprise:
- one or more instructions that, when executed by the processor, cause the processor to:
  - provide the particular portions to the particular resources for execution; and
  - execute the particular portions with the particular resources.

11. The one or more non-transitory computer-readable media of claim 9, where the instructions further comprise:
- one or more instructions that, when executed by the processor, cause the processor to:
  - receive a control strategy for controlling execution of the plurality of processes; and
  - enable the federation of processes to negotiate use of the resources, for the respective ones of the at least two of the plurality of processes, based on the resource usage information and based on the control strategy.

12. The one or more non-transitory computer-readable media of claim 9, where the resource usage information includes information derived from the resources.

13. The one or more non-transitory computer-readable media of claim 9, where the instructions further comprise:
- one or more instructions that, when executed by the processor, cause the processor to:
  - enable the federation of processes to negotiate a use of the resources to allow the respective ones of the at least two of the plurality of processes to utilize, for execution, at least a portion of the resources.

14. The one or more non-transitory computer-readable media of claim 9, where the one or more instructions are repeated by the processor after a predetermined time period or when an external event occurs.

15. The one or more non-transitory computer-readable media of claim 9, where the one or more instructions are continuously repeated by the processor until a predetermined condition occurs.

16. A device, comprising:
- a processor to:
  - identify a plurality of processes to be executed by the device, each of the plurality of processes including one or more portions;
  - determine a quantity of portions for each of the plurality of processes that require resources;
  - receive a resource usage information from the plurality of processes;
  - form a federation of processes that includes the plurality of processes;
  - negotiate among the plurality of processes,
    - the processor, when negotiating among the plurality of process, being to:
      - exchange information regarding specific resources required by each process to other processes in the federation of processes; and
      - determine an allocation of resources for respective ones of at least two of the plurality of processes based on the quantity of portions in each process, the resource usage information, and the exchanged information regarding the specific resources required by each process; and
  - allocate particular resources to particular portions of the respective ones of the at least two of the plurality of processes based on the negotiating among the processes.

17. The device of claim 16, where the processor is further to:
- provide the particular portions to the particular resources for execution; and
- execute the particular portions with the particular resources.

18. The device of claim 16, where the processor is further to:
- receive a control strategy for controlling an execution of the plurality of processes; and
- enable the plurality of processes to negotiate a use of the resources, for the respective ones of the at least two of the plurality of processes, based on the resource usage information and based on the control strategy.

19. The device of claim 16, where the resource usage information includes information derived from the resources.

20. The device of claim 16, where the processor is further to:
- enable the federation of processes to negotiate a usage of the resources,
  - the usage of the resources allowing the respective ones of the at least two of the plurality of processes to utilize, for execution, at least a portion of the resources.

21. The device of claim 16, where the processor is further to:
- repeat, after a predetermined time period or when an external event occurs, the determining the quantity of portions, the receiving the resource usage information, the negotiating among the plurality of processes, and the allocating.

22. The device of claim 16, where the processor is further to:
   continuously repeat, until a predetermined condition occurs, the determining the quantity of portions, the receiving the resource usage information, the negotiating among the plurality of processes, and the allocating.

23. The device of claim 16, where the resources comprise one or more of:
   a hardware resource associated with the device, or
   a software resource associated with the device.

24. The device of claim 23, where the resources comprise the hardware resource, and
   where the hardware resource comprises one or more of:
      a central processing unit (CPU),
      a graphical processing unit (GPU),
      a core of the CPU, or
      a core of the GPU.

25. The device of claim 23, where the resources comprise the software resource, and
   where the software resource comprises one or more of:
      a thread,
      a socket,
      a portion of the thread, or
      a portion of the socket.

* * * * *